United States Patent [19]

Shirai et al.

[11] Patent Number: 4,647,008
[45] Date of Patent: Mar. 3, 1987

[54] SOLENOID VALVE FOR HYDRAULIC CONTROL

[75] Inventors: Hisao Shirai, Aichi; Takuo Sibata, Okazaki; Takashi Izuo, Toyota, all of Japan

[73] Assignee: Toyota Jidosha Kabushiki Kaisha, Aichi, Japan

[21] Appl. No.: 766,800

[22] Filed: Aug. 19, 1985

[30] Foreign Application Priority Data

Aug. 21, 1984 [JP] Japan ................... 59-173930

[51] Int. Cl.$^4$ .............................................. F16K 31/06
[52] U.S. Cl. ........................... 251/129.07; 251/129.15
[58] Field of Search ..................... 251/129.15, 129.07

[56] References Cited

U.S. PATENT DOCUMENTS

| | | | |
|---|---|---|---|
| 3,368,789 | 2/1968 | Martin ........................ | 251/129.15 |
| 3,588,039 | 6/1971 | Chelminski et al. ........... | 251/129.15 |
| 3,653,630 | 4/1972 | Ritsema ..................... | 251/129.15 |
| 4,310,123 | 1/1982 | Te Pastte ................... | 251/129.15 X |

FOREIGN PATENT DOCUMENTS 2814562 10/1979 Fed. Rep. of Germany ................ 251/129.15

*Primary Examiner*—Arnold Rosenthal
*Attorney, Agent, or Firm*—Parkhurst & Oliff

[57] ABSTRACT

A solenoid valve for hydraulic control, comprises: a stationary iron core; a guide pipe; a return spring; a plunger; and a valve body.

Firstly, the plunger is made slidable immediately on the inner periphery of a columnar recess of the stationary iron core, whereby a magnetic reluctance of a magnetic path formed when a current is passed is decreased, so that an attracting force can be increased accordingly.

Furthermore, the plunger made hollow is made slidable on the outer periphery of the guide pipe and the valve body is fixed to and disposed at an end portion of the plunger, so that these movable members can be rendered light in weight.

Further, a member for guiding the sliding of the plunger (a guide pipe) is disposed on the inner periphery of the plunger made hollow, further, this guide member is made hollow, and a return spring is incorporated in this guide member, so that the solenoid valve as a whole can be rendered very compact.

Moreover, an input port is disposed on an axis, so that the positional relationship of another component as being a counterpart, to which the solenoid valve is mounted, can be simplified.

13 Claims, 4 Drawing Figures

SOLENOID VALVE FOR HYDRAULIC CONTROL

BACKGROUND OF THE INVENTION

1. Field of the Invention

This invention relates to a solenoid valve for hydraulic control, and more particularly to improvements in a solenoid valve for hydraulic control suitable for being assembled into a hydraulic control device in a vehicle automatic transmission. The solenoid valve is light in weight, compact in size and high speed in response.

2. Description of the Prior Art

In general, in hydraulic control devices solenoid valves have been used to allow flow and to cut off oil flow in specific oil lines, or, they have been combined with orifices which create or reduce hydraulic pressure in specific oil lines.

FIG. 3 shows an example of a conventional solenoid valve of this type. In FIG. 3 10 designates a stationary iron core, 12 a coil, 14 a plunger which additionally functions as a valve body, 16 an input port and 18 an output port. This solenoid valve is constructed such that the plunger 14 thereof is center-aligned by the inner peripheral portion of a guide pipe 20 made of a non-magnetic material and slidable on the inner peripheral portion of the guide pipe 20.

Another conventional solenoid valve is shown in FIG. 4. In FIG. 4, 10A designates a stationary iron core, 12A a coil, 14A a plunger additionally functioning as a valve body, 16A an input port and 18A an output port, respectively.

This solenoid valve is constructed such that the plunger 14A is comprised of a large-diameter land $14A_1$ disposed in a columnar recess 14A, of the stationary iron core 10A and a small-diameter land $14A_2$ coaxially and integrally formed on the large-diameter land $14A_1$. The outer peripheral surface of the large-diameter land $14A_1$ faces the inner peripheral surface of the columnar recess $10A_1$ of the stationary iron core 10A, and the outer peripheral portion of the small-diameter land $14A_2$ is slidable on guide pipe 20A.

However, in the conventional solenoid valve shown in FIG. 3, when a current is passed to the coil 12, a magnetic path is formed as indicated by an arrow A. In this case, since the wall thickness of the guide pipe 20 cannot be decreased very much from the viewpoint of durability, a disadvantage has been the viewpoint of durability, a disadvantage has been presented in that a magnetic reluctance of the magnetic path is increased and a plunger attracting force is decreased while the current is passed to the coil. This causes the time duration for response, i.e. the time duration required for opening the solenoid valve, to be lengthened. Furthermore, an additional disadvantage is that, when the current passage to the coil is stopped and the plunger 14, additionally functioning as the valve body, is about to close a valve seat 22 through the resiliency of a return spring 15, the solenoid valve receives a reaction force of a high hydraulic pressure from the input port 16, whereby the time duration required for closing the solenoid valve is increased. This disadvantage can be obviated by making the whole solenoid valve larger in size to obtain a higher attracting force. However, this leads to an another disadvantage in that the solenoid valve is increased in weight, the space required for mounting the solenoid valve is increased and the production cost is increased.

On the other hand, with the conventional solenoid valve shown in FIG. 4, when current is passed to the coil 12A, a magnetic path indicated by an arrow B is formed, whereby a magnetic reluctance is relatively low, so that the disadvantageous lowering of the attracting force due to an increase in magnetic reluctance is obviated. Furthermore, since the input port 16A is disposed in a direction perpendicular to the sliding direction of the plunger 14A, the disadvantage of the valve closing not being smooth due to the high hydraulic pressure from the input port 16A is obviated. However, this structure is disadvantageous because the plunger 14A is constructed such that the large-diameter land $14A_1$ partially forming the magnetic path B is integrally formed with the small-diameter land $14A_2$, additionally functioning as the valve body, whereby the mass of the movable portions is large. Thus, the attracting force is relatively decreased, creating the disadvantage that high speed response cannot be obtained in the time durations required for both the opening and closing the solenoid valve. Furthermore, in order to center-align the large heavy plunger 14A with high accuracy, it is necessary to enlarge the guide pipe 20A which is constructed of non-magnetic material, the result is that an outer diameter D of the valve seat portion is disadvantageously increased. Further since the input port 16A of the hydraulic pressure is provided at the side portion of the solenoid valve (upwardly in the drawing) and the output port 18A is disposed on the axis, disadvantages are presented in that a counterpart hydraulic control component, to which this solenoid valve is mounted, becomes complicated in circuit and in positional arrangement, and the space required for mounting the solenoid valve disadvantageously tends to increase.

SUMMARY OF THE INVENTION

The present invention was developed to obviate the above-described disadvantages of the prior art. It is accordingly an object of the present invention to provide a solenoid valve for hydraulic control, wherein high speed response can be obtained in both the time durations required for opening and closing the solenoid valve. The solenoid valve itself can be constructed compact in size and light in weight, the positional relationship with another counterpart component, to which the solenoid valve is mounted, can be simplified, the required space for mounting can be decreased, and the production cost can be reduced.

To this end, the present invention contemplates a solenoid valve for hydraulic control which comprises:

a stationary iron core having a columnar or tubular recess;

a guide pipe made of a non-magnetic material, disposed in the columnar recess of the stationary iron core, being coaxial therewith, and solidly secured to a bottom face of the columnar recess;

a return spring disposed in a hollow portion of the guide pipe;

a hollow plunger slidable on the inner periphery of the columnar recess and along the outer periphery of the guide pipe; and a valve body fixed to and disposed at an end portion on the side of an open end of the columnar recess of the plunger, with the end face on the side of the bottom face of the columnar recess being a surface for receiving the return spring, and the end face on the side of the open end of the columnar recess being a valve face capable of shutting off the intrusion of oil from the input port.

A preferable specific form in the above-described construction is of such an arrangement that the stationary iron core is constituted by a main body of stationary iron core additionally functioning as an iron core case and having a generally E-shaped cross section and a flange member integrally formed with a valve seat base of the valve body. As a result, production (casting) and assembling of the stationary iron core is facilitated.

Another preferable specific form in the above-described construction is of such an arrangement that the guide pipe is pressed into the recess formed from the central portion of the bottom face of the columnar recess toward the interior of the stationary iron core, whereby the guide pipe is solidly secured to the bottom face of the columnar recess. As a result, the guide pipe can be accurately and easily fixed to the columnar recess, being coaxial therewith.

A further preferable specific form is of such an arrangement that the return spring is a coil spring. As a result, a solenoid valve for hydraulic control which is compact in size and low in cost can be obtained.

A still further preferable specific form is of such an arrangement that the valve body is provided at the central portion of the valve face thereof with a through-hole formed coaxially with the columnar recess and the guide pipe. As a result, when the valve face of the valve body closes the valve seat, the reaction force due to hydraulic pressure can be easily reduced offset, or conversely, utilized to actively close the valve body, so that the time duration required for closing the solenoid valve can be shortened.

Furthermore, in the above-described construction, when the stationary iron core is constituted by a main body additionally functioning as an iron core case and having a generally E-shaped cross section and a flange member integrally formed with a valve seat base of the valve body, it is preferable that the plunger faces the flange member partially forming the stationary iron core with the outer peripheral portion of the plunger having a slight clearance with the flange member. As a result, assembly of the solenoid valve as a whole including the stationary iron core and the plunger can be simplified and a magnetic path having a low magnetic reluctance can be formed.

According to the present invention, the plunger is made slidable immediately on the inner periphery of the columnar recess of the stationary iron core, whereby the magnetic reluctance of the magnetic path can be reduced to the extreme during the passage of current, so that the attracting force can be increased accordingly to thereby obtain a high speed response.

Furthermore, the hollow plunger is caused to slide on the outer periphery of the guide pipe and the valve body is fixed to and disposed at the end portion of the plunger, so that the movable members can be rendered light in weight and high speed response can be obtained accordingly.

Further, the member for guiding the sliding of the plunger (guide pipe) is disposed on the inner periphery of the hollow plunger. Further the guide member is hollow, and the return spring is disposed on the inner periphery of the guide member, so that the solenoid valve as a whole can be rendered compact in size, light in weight and the space required for mounting can be reduced.

Furthermore, the input port is positioned on the axis, so that the positional relationship with the component as being the counterpart, to which the solenoid valve is mounted, can be simplified, and the space required for mounting can be reduced.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will be given hereunder of one embodiment of the present invention with reference to the drawings.

Figure 1:
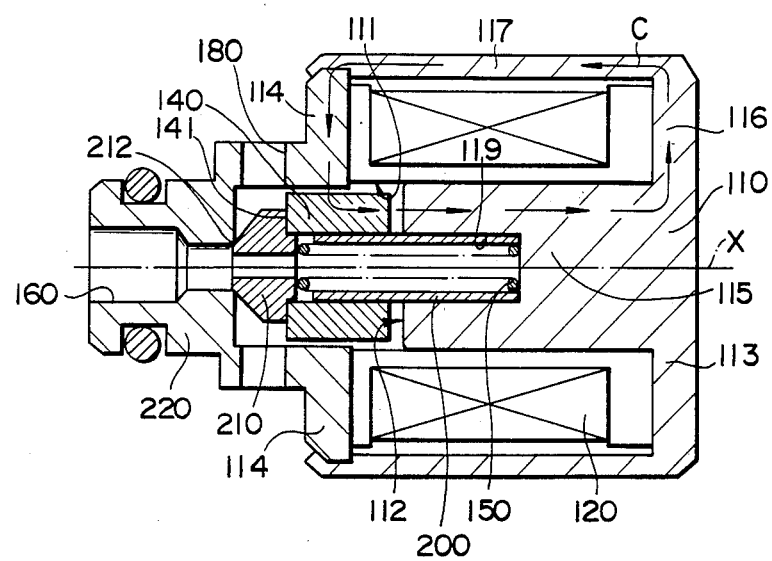
FIG. 1 is a longitudinal sectional view showing one embodiment of the the solenoid valve for hydraulic control according to the present invention.
Figure 2:
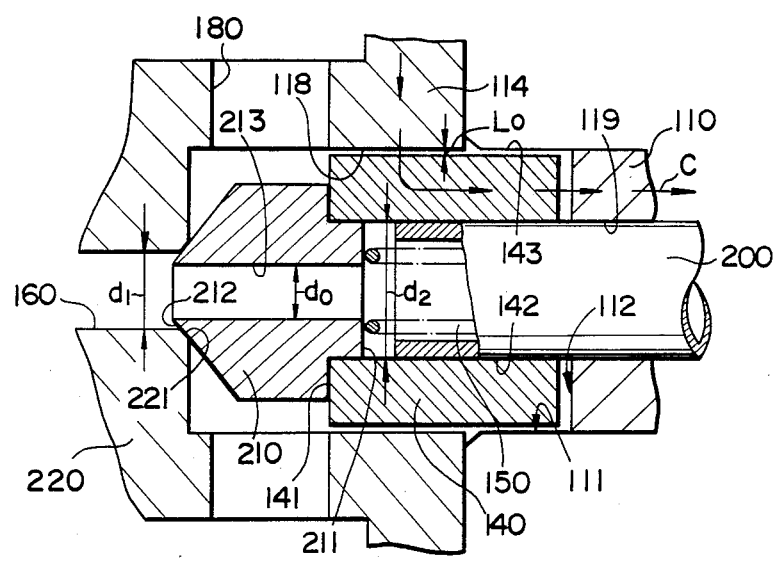
FIG. 2 is an enlarged view showing the valve body and thereabout in FIG. 1.
Figure 3:
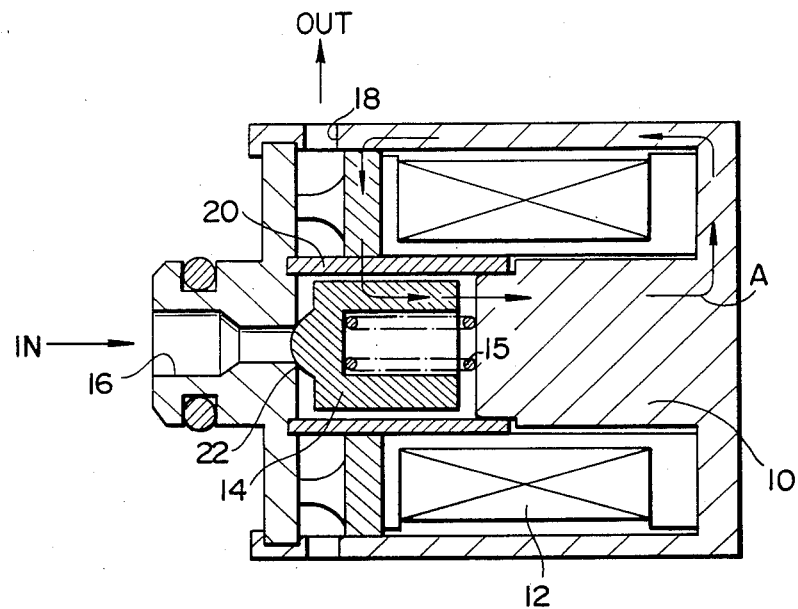
FIG. 3 is a longitudinal sectional view similar to FIG. 1, showing one conventional example of the solenoid valve.
Figure 4:
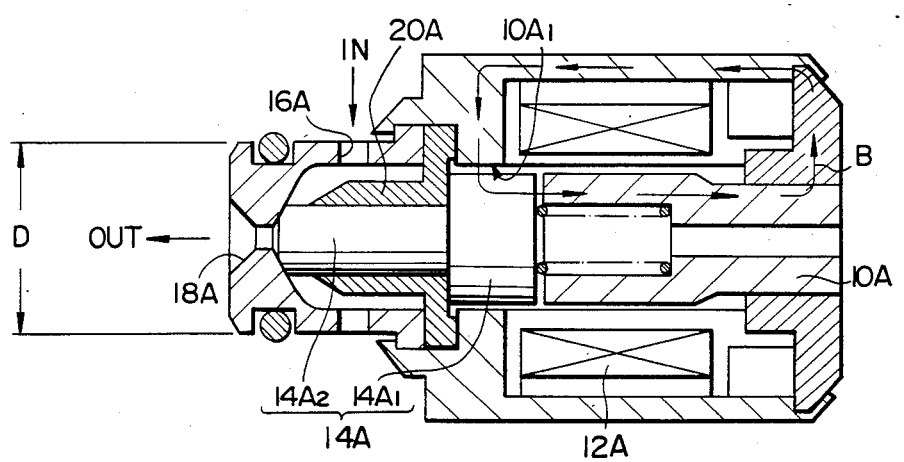
FIG. 4 is a longitudinal sectional view similar to FIG. 1, showing another conventional example of the solenoid valve.

As shown in FIGS. 1 and 2, this solenoid valve for hydraulic control principally comprises:

a stationary iron core 110 having a columnar recess 111;

a guide pipe 200 made of a non-magnetic material, disposed in the columnar recess 111 of the stationary iron core 110, being coaxially therewith, and solidly secured by means of press-in means to a bottom face 112 of the columnar recess 111;

a return spring 150 disposed in a hollow portion of the guide pipe 200;

a hollow plunger 140 slidable on the inner periphery of the columnar recess 111 and along the outer periphery of the guide pipe 200;

a valve body 210 fixed to and disposed at an end portion 141 on the side of an open end of the columnar recess of the plunger 140, with the end face on the side of the bottom face of the columnar recess being a surface 211 for receiving the return spring 150, and the end face on the side of the open end of the columnar recess being a valve face 212 capable of shutting off the intrusion of oil from the input port 160.

The stationary iron core 110 is constituted by a main body 113 of stationary iron core additionally functioning as an iron core case and of a generally E-shape in cross section (an inverted E-shape in the drawing) and a flange member 114 integrally formed with a valve seat base 220 of the valve body 210, and the columnar recess 111 is principally formed by a hollow portion 118 of the flange member 114.

A recess 119 having an inner diameter slightly smaller than the outer periphery of the guide pipe 200 is formed from the central portion of the bottom face 112 of this columnar recess 111 into the main body 113 of the stationary iron core, and the guide pipe 200 is pressed into this recess 119, so as to be solidly secured to the bottom face 112 of the columnar recess 111.

The return spring 150 is a coil spring, disposed in the hollow portion of this guide pipe 200, and constantly biases the surface 211 for receiving the valve body 210 to be left in the drawing.

The plunger 140 is formed therein with a hollow portion slidable on the outer periphery of the guide pipe 200 smoothly and without looseness and the like. The outer peripheral portion 142 of the plunger 140 faces the hollow portion 118 of the flange member 114 partially forming the stationary iron core 110 through a slight clearance $L_0$.

The valve body 210 is solidly secured by bonding, press-in or the like to the end portion 141 on the side of the open end of the columnar recess of the plunger 140, and provided at the central portion of the valve face 212 with a through-hole 213 formed coaxially with the columnar recess 111 and the guide pipe 200.

Additionally, referring to the drawing, designated at 120 is a coil, 160 an input port formed in the valve seat base 220 coaxially (on axis X) with the columnar recess 111, the guide pipe 200, the valve body 210 and the like, and 180 an output port formed in a direction perpendicular to the axis X, respectively.

Description will now be given of action of this embodiment.

When current is passed to the coil 120, a magnetic path is formed in the sequential order of the central portion 115 of the stationary iron core 110, a bottom portion 116, a side wall 117, the flange member 114 and the plunger 140 as indicated by an arrow C. This magnetic path causes the plunger 140 to be attracted toward the bottom face 112 of the columnar recess 111 of the stationary iron core 110 to slide on the outer periphery of the guide pipe 200 to the right in the drawing.

As a result, the valve body 210, which is solidly secured to the plunger 140, overcomes the bias of the return spring 150 and moves along with the plunger 140, to the right in the drawing. The valve face 212 of the valve body 210 is separated from the valve seat 221 of the valve seat base 220, hydraulic fluid under high pressure flows in through the input port 160, and flows out from the output port 180.

Subsequently, when the current flowing through the coil 120 is cut off, the magnetic path disappears, the plunger 140 and the valve body 210 fixed to the plunger 140 are moved to the left in the drawing through the biasing force of the return spring 150 and the valve seat 221 is closed by the valve face 212 of the valve body 210, whereby the flow of fluid through the input port 160 is shut off.

In this case, a hydraulic pressure commensurate with a hydraulic pressure from the input port 160 is applied to the receiving surface 211 of the valve body 210 by oil filled in the hollow portion of the guide pipe 200 through the through-hole 213 formed in the valve body 210, so that the valve body 210 can smoothly close the valve seat 221 no matter whether the hydraulic pressure from the input port is high or low.

More specifically, as indicated in FIG. 2, the inner diameter of the through-hole 213 is called $d_0$, an inner diameter of the valve seat 221 of the input port 160 is called $d_1$, and an inner diameter of plunger 140 is called $d_2$. Immediately before the valve seat 221 is closed by the valve face 212 of the valve body 210, when the hydraulic pressure on the input side is P, if the valve body 210 is solid, then a reaction force of $P \times \pi d_1^2/4$ is received by the valve body 210. However, this reaction force is decreased to $P \times \pi(d_1^2 - d_0^2)/4$ due to the presence of the through-hole 213, and moreover, the hydraulic pressure is imparted to the plunger 140 and into the guide pipe 200 through this through-hole 213, the reaction force of $P \times \pi(d_2^2 - d_0^2)/4$ works in the direction of closing the valve body 210. In consequence, the force of $P \times \pi(d_1^2 - d_2^2)/4$ acts on the valve body 210 after all. Therefore, various values are selected for these $d_1$ and $d_2$, so that, when the solenoid valve is closed, the reaction force of the hydraulic pressure P can be readily offset or actively utilized on the contrary.

According to this embodiment, the inner peripheral portion 142 of the plunger 140 is center-aligned and guided with high accuracy by the outer periphery of the guide pipe 200, whereby a clearance $L_0$ between the outer peripheral portion 143 of the plunger 140 and the hollow portion 118 of the plunger 114 can be set at a small value with high accuracy and the magnetic reluctance of the magnetic path as indicated by an arrow C can be decreased, so that the attracting force of the plunger can be increased and the time duration required for opening the solenoid valve can be shortened accordingly.

Additionally, both the plunger 140 and the valve body, which are movable members, are made hollow, whereby the movable members are rendered light in weight, so that high speed response can be secured both in the time durations required for opening and closing.

Further, due to the presence of the through-hole 213 formed in the valve body 210, when the valve face 212 of the valve body 210 closes the valve seat 221, the reaction force due to the hydraulic pressure can be readily decreased, offset, or conversely, the reaction force can be actively utilized to close the valve body, so that the time duration required for closing the solenoid valve can be shortened.

On the other hand, the guide pipe 200 is disposed in the hollow portion of the plunger 140 and the return spring 150 is disposed in the hollow portion of the guide pipe 200, so that the main components of the solenoid valve can be housed very compactedly and the solenoid valve as a whole can be rendered light in weight.

Furthermore, the input port is aligned with the sliding direction of the valve body 210 and the output port is disposed in a direction perpendicular to the input port, whereby the positional relationship with another componenet as being a counterpart, to which the solenoid valve is mounted, can be simplified, so that the space required for mounting the solenoid valve can be reduced.

Additionally, as the measure for solidly securing the guide pipe 200 to the bottom face of the columnar recess 111, the recess 119 having the inner diameter slightly smaller than the outer periphery of the guide pipe 200 is formed in the stationary iron core 110, and the guide pipe 200 is pressed into this recess 119, so that the guide pipe 200 can be solidly secured to the columnar recess, coaxially therewith.

Furthermore, in the above embodiment, the stationary iron core 110 is constituted by two members including the main body 113 and the flange member 114. However, the stationary iron core according to the present invention need not necessarily limit the number of members constituting it.

Additionally, in the above embodiment, as the means for solidly securing the guide pipe 200, press-in has been adopted. However, the solidly securing means according to the present invention need not necessarily be limited to this. Any means may be adopted which permits the axis of the columnar recess to be center-aligned with high accuracy and fixed relatively.

Further, in the above embodiment, as the return spring 150, the coil spring has been adopted. However, as the return spring according to the present invention, the arrangement of the return spring need not necessarily be limited. Any means which will bias the plunger 140 in a direction away from the stationary iron core 110 is sufficient.

Furthermore, in the above embodiment, the valve body has been provided with the through-hole 213 so as to shorten the time duration required for closing the solenoid valve. However, according to the present invention, this through-hole 213 need not necessarily be provided.

While the preferred embodiments of the present invention have been described, it is to be understood that the invention is not limited thereto, and may be otherwise embodied within the scope of the following claims.

What is claimed is:

1. A solenoid valve for hydraulic control including input and output ports, comprising:
    a stationary iron core including a tubular recess, said tubular recess including a bottom face;
    a hollow guide pipe comprised of a nonmagnetic material, said guide pipe being disposed in said tubular recess and being coaxial therewith, said guide pipe being secured to said bottom face of the tubular recess, said guide pipe haing an outer periphery;
    a return spring disposed in said hollow guide pipe;
    a hollow plunger slidable in said tubular recess and along said outer periphery of said guide pipe, said hollow plunger including a first open end; and
    a valve body having a first side and a second side, said valve body being fixed to said first open end of said hollow plunger, said first side being in contact with said return spring, said second side of said valve body being a valve face capable of shutting off the intrusion of oil from said input port, said valve body including a through hole which extends through said first side and said second side.

2. The solenoid valve as set forth in the claim 1, wherein said stationary iron core comprises a main body functioning as an iron core case having a general E-shaped cross section and a flange member, said valve body including a valve seat base, said flange member being integrally formed with said valve seat base.

3. The solenoid valve as set forth in claim 1, wherein said guide pipe is pressed into said tubular recess, said recess being in a central portion of the interior of said stationary iron core, whereby said guide pipe is secured to said bottom face of said tubular recess.

4. The solenoid valve as set forth in claim 1, wherein said return spring is a coil spring.

5. The solenoid valve as set forth in claim 1, wherein said through-hole is provided in a central portion of said valve body and is coaxial with said tubular recess and said guide pipe.

6. The solenoid valve as set forth in claim 2, wherein said guide pipe is pressed into said tubular recess formed in a central portion of the interior of said stationary iron core, whereby said guide pipe is secured to said bottom face of said columnar recess.

7. The solenoid valve as set forth in claim 2, wherein said return spring is a coil spring.

8. The solenoid valve as set forth in claim 2, wherein said through-hole is provided in a central portion of said valve body and is coaxial with said tubular recess and said guide pipe.

9. The solenoid valve as set forth in claim 3, wherein said return spring is a coil spring.

10. The solenoid valve as set forth in claim 3, wherein said through-hole is provided in a central portion of said valve body and is coaxial with said columnar recess and said guide pipe.

11. The solenoid valve as set forth in claim 4, wherein said through-hole is provided in a central portion of said valve body and is coaxial with said tubular recess and said guide pipe.

12. The solenoid valve as set forth in claim 2, wherein an outer peripheral portion of said plunger faces said flange member and is separated therefrom by a slight clearance.

13. The solenoid valve as set forth in claim 1, wherein said input port is axially aligned with said tubular recess.

* * * * *